(12) United States Patent
Matthews

(10) Patent No.: US 10,458,148 B1
(45) Date of Patent: Oct. 29, 2019

(54) METHOD TO PREVENT DRY ROT DAMAGE TO A WOOD FENCE

(71) Applicant: Jeffrey Michael Matthews, Half Moon Bay, CA (US)

(72) Inventor: Jeffrey Michael Matthews, Half Moon Bay, CA (US)

( * ) Notice: Subject to any disclaimer, the term of this patent is extended or adjusted under 35 U.S.C. 154(b) by 282 days.

(21) Appl. No.: 15/646,368

(22) Filed: Jul. 11, 2017

Related U.S. Application Data

(60) Provisional application No. 62/360,628, filed on Jul. 11, 2016.

(51) Int. Cl.

| | |
|---|---|
| *E04H 17/14* | (2006.01) |
| *E04F 15/02* | (2006.01) |
| *B23P 6/00* | (2006.01) |
| *E04F 19/04* | (2006.01) |
| *E04D 13/15* | (2006.01) |
| *E04C 3/18* | (2006.01) |
| *E04D 13/04* | (2006.01) |

(52) U.S. Cl.
CPC .............. *E04H 17/143* (2013.01); *B23P 6/00* (2013.01); *E04C 3/185* (2013.01); *E04D 13/15* (2013.01); *E04F 15/02016* (2013.01); *E04F 15/02183* (2013.01); *E04F 19/045* (2013.01); *E04H 17/1421* (2013.01); *E04H 17/1434* (2013.01); *E04D 2013/0468* (2013.01); *E04F 2015/02066* (2013.01); *E04H 2017/1447* (2013.01)

(58) Field of Classification Search
CPC ................ E04C 3/185; E04F 15/02183; E04F 2015/02066; E04F 15/02016; E04F 19/045; B23P 6/00; E04H 17/143; E04H 17/1434; E04H 2017/1447; E04H 17/1421; E04D 13/15; E04D 2013/0468
See application file for complete search history.

(56) References Cited

U.S. PATENT DOCUMENTS

| | | |
|---|---|---|
| 5,148,644 A | 9/1992 | Weir |
| 6,108,992 A | 8/2000 | Shaw |
| 8,667,744 B2 | 3/2014 | Shaw |

*Primary Examiner* — Jermie E Cozart
(74) *Attorney, Agent, or Firm* — Plager Schak LLP; Mark H. Plager; Eric Liou

(57) ABSTRACT

A spacer apparatus and method to prevent dry rot damage to a fence is provided. The fence includes posts disposed in the ground, a horizontal support plank coupled to each pair of adjacent posts, pickets disposed on the horizontal support plank, and a pair of horizontal rails disposed on the horizontal support plank. The spacer apparatus includes a plate and a pair of end tabs coupled to the plate, each end tab coupled to a side edge of the plate and having a first width that is less than a second width of the plate along the side edge. The plate is disposed on the horizontal support plank to permit the end tabs to conform to the horizontal support plank for stability, thereby enabling the plate to support the pickets and horizontal rails above the horizontal support plank. The end tabs are then removed from the plate.

3 Claims, 3 Drawing Sheets

METHOD TO PREVENT DRY ROT DAMAGE TO A WOOD FENCE

RELATED APPLICATION

The application claims priority to provisional patent application U.S. Ser. No. 62/360,628 filed on Jul. 11, 2016, the entire contents of which is herein incorporated by reference.

BACKGROUND

The embodiments herein relate generally to outdoor wood fences used to enclose areas and/or delineate the boundaries of a tract of property.

Wood fences such as picket fences and shadow box fences are commonly used on residential and commercial premises. In certain configurations, these fences comprise a plurality of posts disposed into the ground, a lower horizontal support plank coupled to adjacent posts and extending above the ground, a plurality of pickets disposed on the lower horizontal support plank, and a pair of horizontal rails disposed on the lower horizontal support plank to support the pickets in an upright position. The top of the pickets are coupled to an upper horizontal support plank, which is coupled to the adjacent posts.

Moisture from rain, snow and dew collect on these wood fences and drip down to the pickets and horizontal rails. Since the pickets and horizontal rails are disposed directly on the horizontal support plank, moisture stagnates in these areas. As a result, moisture remains in contact with the bottom of the pickets and horizontal rails and causes dry rot damage. This negatively affects the structural integrity of the fence and reduces its operational lifetime. In addition, replacement and maintenance costs of the fence greatly increase.

Several rot protecting devices for wood members exist as disclosed in U.S. Pat. Nos. 6,108,992, 8,667,744 and 5,148,644. Each of these devices is coupled to a wood member and designed to protect the member from moisture or contact with another object. However, these devices are limited because they comprise complicated designs with multiple protrusions, slots, and the like. In addition these devices can be difficult to use and they are not aesthetically pleasing.

As such, there is a need in the industry for a spacer apparatus for use with a wood fence that addresses the limitations of the prior art, which helps to permit water to run off the pickets and/or rails to prevent the incidence of dry rot damage to the fence.

SUMMARY

A spacer apparatus to prevent dry rot damage to a fence is provided. The fence comprises a plurality of posts disposed vertically into a ground surface, a horizontal support plank coupled to each pair of adjacent posts in the plurality of posts, a plurality of pickets disposed on the horizontal support plank and a pair of horizontal rails disposed on the horizontal support plank and configured to support the plurality pickets in an upright position. The spacer apparatus comprises a plate comprising a top surface, a bottom surface opposite the top surface, a front edge, a rear edge opposite the front edge, and a pair of side edges connecting the front and rear edges, and a pair of end tabs coupled to the plate, each end tab in the pair of end tabs coupled to one of the pair of side edges of the plate and oriented generally perpendicular to a longitudinal axis of the plate, each end tab comprising a first width that is less than a second width of the plate along each side edge, wherein the plate is disposed on the horizontal support plank to permit the pair of end tabs to conform to contours of the horizontal support plank, thereby enabling the plate to support the plurality of pickets and pair of horizontal rails in an elevated position above the horizontal support plank.

In certain embodiments of the invention, a method for preventing dry rot damage to a fence is provided. The method comprises providing a first spacer apparatus, disposing the first spacer apparatus on the horizontal support plank so that the plate and pair of end tabs conform to contours of the horizontal support plank, disposing the plurality of pickets and pair of horizontal rails on the first spacer apparatus to create a gap between both the horizontal rails and pickets, and the horizontal support plank, and removing the pair of end tabs from the first spacer apparatus. In certain embodiments, a plurality of spacer apparatuses are coupled to the horizontal support plank.

BRIEF DESCRIPTION OF THE FIGURES

The detailed description of some embodiments of the invention will be made below with reference to the accompanying figures, wherein the figures disclose one or more embodiments of the present invention.

DETAILED DESCRIPTION OF CERTAIN EMBODIMENTS

As depicted in FIGS. 1-4, spacer apparatus 10 is configured for use with fence 32. Fence 32 is preferably made from wood and is a picket fence or a shadow box fence in certain embodiments. However, fence 32 may be any alternate type of fence. Spacer apparatus 10 is configured to prevent or minimize the incidence of dry rot damage to certain components of the fence by allowing moisture and/or fluids to run off the fence.

Figure 2:
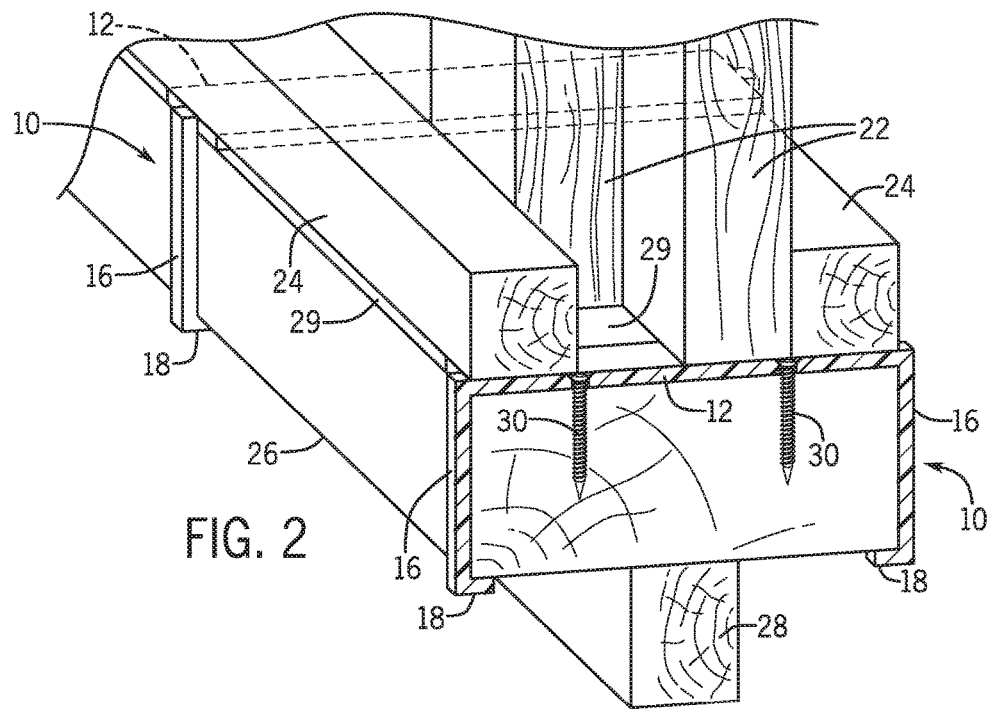
FIG. 2 depicts a perspective view of certain embodiments of the spacer apparatus shown in use.
Figure 4:
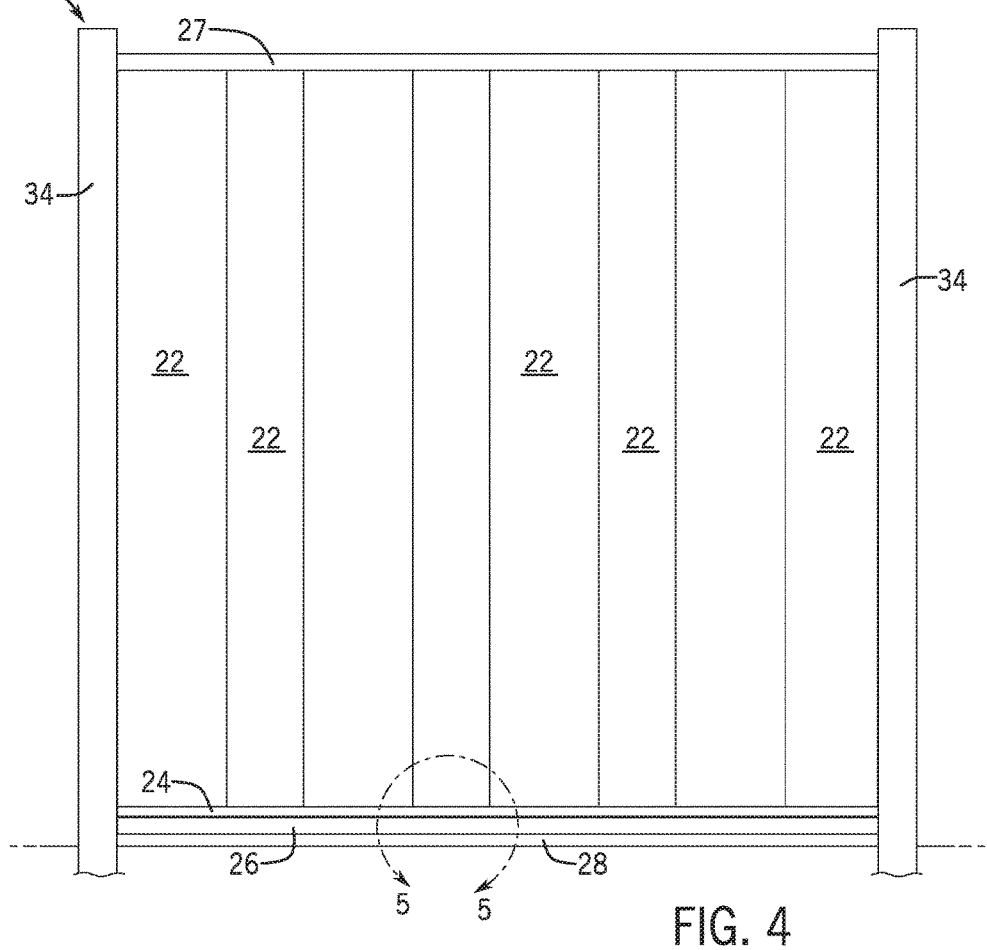
FIG. 4 depicts a front view of an exemplary fence for use with certain embodiments of the spacer apparatus.

In certain embodiments, fence 32 comprises vertical boards 22, horizontal rails 24, lower support plank 26, upper support plank 27 and base plank 28. As depicted in FIGS. 2 and 4, an exemplary construction of fence 32 comprises a plurality of posts 34 disposed into the ground. Although the figures depict two posts 34, it shall be appreciated that any number of posts 34 may be used to vary the length of fence 32.

Base plank 28 is disposed on the ground and coupled to an adjacent pair of posts 34 by mechanical fasteners such as nails or screws. In one embodiment, base plank 28 is a 1"×8" elongated wood member. Lower support plank 26 is disposed on top of base plank 28 and is coupled to the adjacent pair of posts 34 by mechanical fasteners such as nails or screws. A pair of rails 24 are disposed on lower support plank 26 and oriented to extend horizontally on top of lower support plank 26. A plurality of pickets such as vertical boards 22 are disposed on top of lower support plank 26. The pair of horizontal rails 24 sandwich vertical boards 22. This helps to support vertical boards 22 upright. In one embodiment, vertical boards 22 may be coupled to one or both horizontal rails 24 by mechanical fasteners. In one embodiment, horizontal rails 14 may be coupled to lower support plank 26 by mechanical fasteners.

Upper support plank 27 is disposed on the top ends of vertical boards 22 and is coupled to the adjacent pair of posts 34 by mechanical fasteners. In certain embodiments, vertical boards 22 may be coupled to upper support plank 27 by mechanical fasteners. In one embodiment, lower and upper support planks 26, 27 each comprises a 2"×4" wood plank. However, the lower and upper support planks 26, 27 may have variable dimensions.

Figure 1:
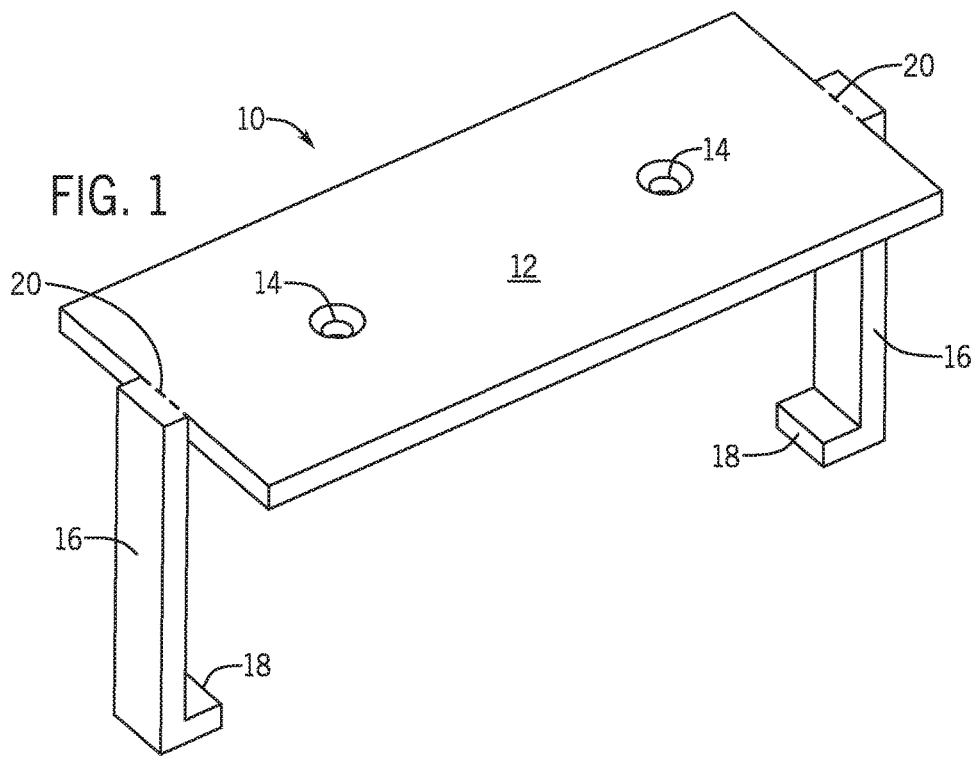
FIG. 1 depicts a perspective view of certain embodiments of the spacer apparatus.

As depicted in FIGS. 1-2, spacer apparatus 10 is configured to be disposed around lower support plank 26 to create gap 29 between both horizontal rails 24 and vertical boards 22, and lower support plank 26. As a result, spacer apparatus 10 supports both horizontal rails 24 and vertical boards 22 in an elevated position above lower support plank 26 to permit moisture and/or fluid on fence 32 to drip down and run off into gap 29.

Spacer apparatus 10 generally comprises plate 12 and a pair of end tabs 16. In a preferred embodiment, spacer apparatus 10 is made from plastic. However, alternative materials such as metal, wood, and the like, may be used instead. Plate 12 comprises a generally rectangular shape with approximate dimensions of 3½" length, 1½" width and ¼" thickness. Plate 12 comprises a pair of countersunk openings 14 disposed therethrough and configured to receive mechanical fasteners such as screws 30.

Figure 3:
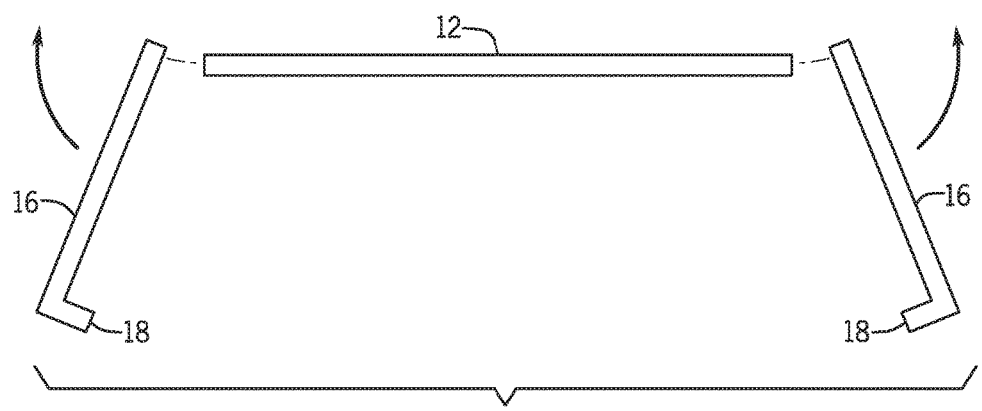
FIG. 3 depicts an exploded side view of certain embodiments of the spacer apparatus.

A pair of end tabs 16 are coupled to opposing side edges of plate 12. End tabs 16 extend generally perpendicular to a longitudinal axis of plate 12. In one embodiment, each end tab 16 comprises an approximate height of 1½" and width of ¼". Lip 18 extends from the bottom of each end tab 16 generally perpendicular to a longitudinal axis of end tab 16. The junction between each end tab 16 and plate 12 comprises perforations 20. This permits each end tab 16 to be easily bent upward and detached from plate 12 as depicted in FIG. 3. End tabs 16 are easily detached because the width of each end tab 16 is smaller than the width of plate 12 along the connecting side edge.

In operation, one or more of the following steps are performed to use spacer apparatus 10. Posts 34, base plank 28, and lower support plank 26 are disposed on the ground as described before. Between each adjacent pair of posts 34, a plurality of spacer apparatuses 10 are disposed around lower support plank 26 as depicted in FIG. 2. The distance between adjacent spacer apparatuses 10 may vary.

The shape of spacer apparatus 10 permits plate 12, end tabs 16 and lips 18 to conform to contours of lower support plank 26. This maintains spacer apparatus 10 in a stationary position to permit a user to drive a pair of screws 30 through countersunk openings 14 in plate 12. This firmly secures each spacer apparatus 10 to lower support plank 26.

Figure 5:
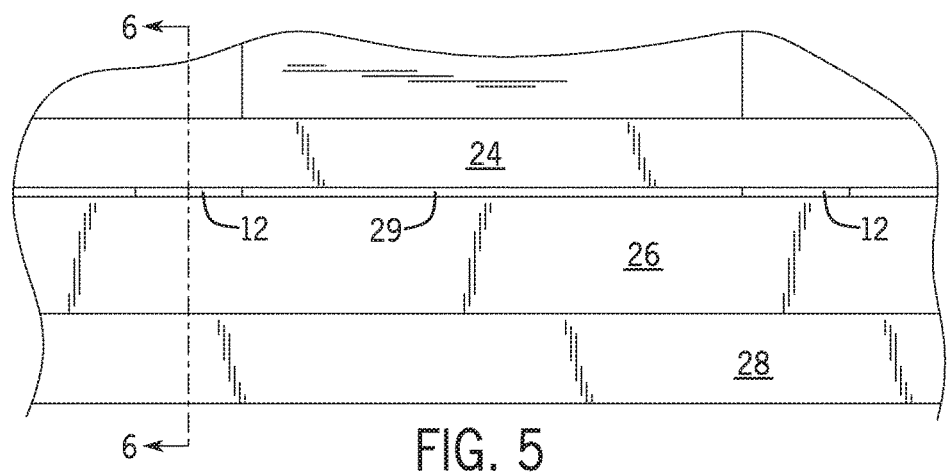
FIG. 5 depicts a front elevation view of the exemplary fence for use with certain embodiments of the spacer apparatus taken along line 5-5 in FIG. 4.
Figure 6:
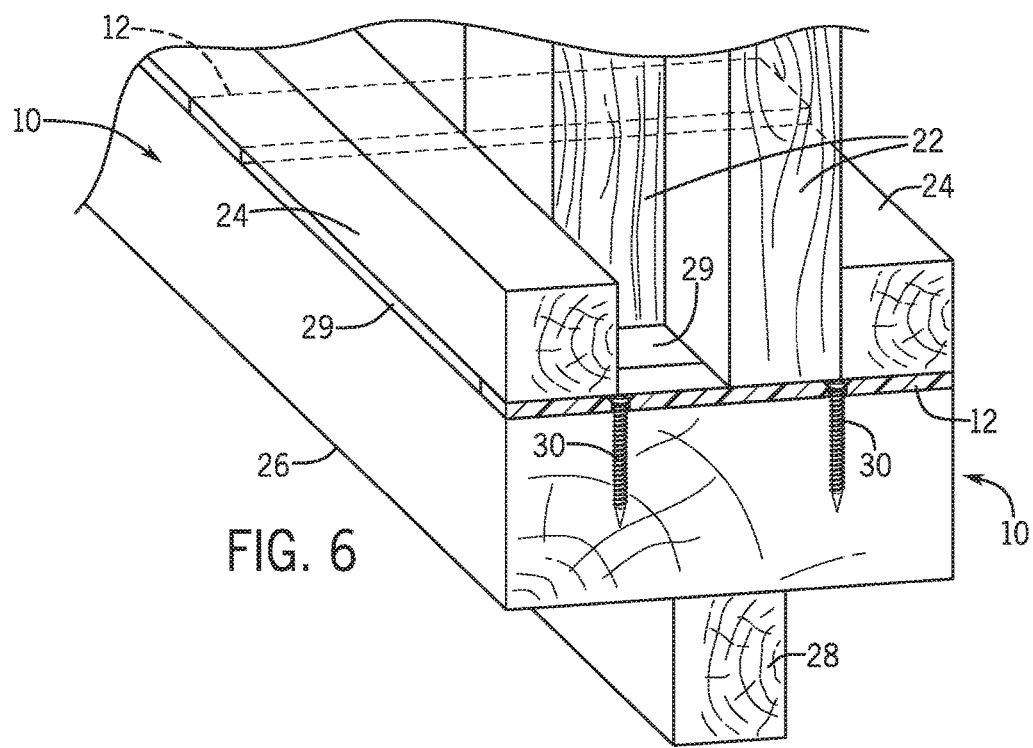
FIG. 6 depicts a perspective view of certain embodiments of the spacer apparatus shown in use taken along line 6-6 in FIG. 5.

The pair of horizontal rails 24 and vertical boards 22 are disposed on top of the plurality of spacer apparatuses 10 as depicted in FIGS. 2 and 4. Upper rail 27 is coupled to each adjacent pair of posts 34 and the top ends of vertical fence boards 22. End tabs 16 are folded along perforations 20 and detached from each plate 12 as depicted in FIGS. 5-6.

After the assembly, support apparatuses 10 support horizontal rails 24 and vertical boards 22 in an elevated position above lower support plank 26 to permit moisture and/or fluid on upper support plank 27, vertical boards 22 and horizontal rails 24 to drip down and run off into gap 29. Gap 29 is approximately ¼" between both vertical boards 22 and horizontal rails 24, and lower support plank 26. Since moisture and/or fluid on fence 32 run off into gap 29, dry rot damage of fence 32 is prevented or minimized.

It shall be appreciated that the components of spacer apparatus 10 described in several embodiments herein may comprise any alternative known materials in the field and be of any color, size and/or dimensions. It shall be appreciated that the components of spacer apparatus 10 described herein may be manufactured and assembled using any known techniques in the field.

Persons of ordinary skill in the art may appreciate that numerous design configurations may be possible to enjoy the functional benefits of the inventive systems and methods. Thus, given the wide variety of configurations and arrangements of embodiments of the present invention the scope of the invention is reflected by the breadth of the claims below rather than narrowed by the embodiments described above.

What is claimed is:

1. A method for preventing dry rot damage to a fence, the fence comprising a plurality of posts disposed vertically into a ground surface, a horizontal support plank coupled to each pair of adjacent posts in the plurality of posts, a plurality of pickets disposed on the horizontal support plank and a pair of horizontal rails disposed on the horizontal support plank and configured to support the plurality pickets in an upright position, the method comprising:

providing a first spacer apparatus, the spacer apparatus comprising:
a plate comprising a top surface, a bottom surface opposite the top surface, a front edge, a rear edge opposite the front edge, and a pair of side edges connecting the front and rear edges; and
a pair of end tabs coupled to the plate, each end tab in the pair of end tabs coupled to one of the pair of side edges of the plate and oriented generally perpendicular to a longitudinal axis of the plate, each end tab comprising a first width that is less than a second width of the plate along each side edge;

disposing the first spacer apparatus on the horizontal support plank so that the plate and pair of end tabs conform to contours of the horizontal support plank;

disposing the plurality of pickets and pair of horizontal rails on the first spacer apparatus to create a gap between both the horizontal rails and plurality of pickets and the horizontal support plank; and removing the pair of end tabs from the first spacer apparatus.

2. The method of claim 1, further comprising providing a second spacer apparatus for use with the fence, the second spacer apparatus comprising:

a plate comprising a top surface, a bottom surface opposite the top surface, a front edge, a rear edge opposite the front edge, and a pair of side edges connecting the front and rear edges; and a pair of end tabs coupled to the plate, each end tab in the pair of end tabs coupled to one of the pair of side edges of the plate and oriented generally perpendicular to a longitudinal axis of the plate, each end tab comprising a first width that is less than a second width of the plate along each side edge.

3. The method of claim 2, further comprising disposing the second spacer apparatus on the horizontal support plank so that the plate and pair of end tabs of the second spacer apparatus conform to contours of the horizontal support plank, disposing the plurality of pickets and pair of horizontal rails on the second spacer apparatus to maintain the gap between both the horizontal rails and plurality of pickets and the horizontal support plank, and removing the pair of end tabs from the plate of the second spacer apparatus.

\* \* \* \* \*